(12) United States Patent
Jensen

(10) Patent No.: US 6,723,293 B2
(45) Date of Patent: Apr. 20, 2004

(54) SYSTEM AND METHOD FOR TREATING COOLING TOWER WATER

(75) Inventor: Lonald H. Jensen, Las Vegas, NV (US)

(73) Assignee: Nytrox 1, Inc., Las Vegas, NV (US)

( * ) Notice: Subject to any disclaimer, the term of this patent is extended or adjusted under 35 U.S.C. 154(b) by 0 days.

(21) Appl. No.: 09/734,368

(22) Filed: Dec. 12, 2000

(65) Prior Publication Data
US 2002/0071793 A1 Jun. 13, 2002

(51) Int. Cl.[7] ................................................ B01J 19/08
(52) U.S. Cl. .................................. 422/186.07; 204/176
(58) Field of Search ...................... 422/186.07; 204/176

(56) References Cited

U.S. PATENT DOCUMENTS 5,679,257 A * 10/1997 Coate et al. ................. 210/695
6,277,288 B1 * 8/2001 Gargas ........................ 210/748

* cited by examiner

Primary Examiner—Kishor Mayekar
(74) Attorney, Agent, or Firm—Jeffrey Weiss; Harry M. Weiss; Weiss, Moy & Harris, P.C.

(57) ABSTRACT

The system and method utilizes an apparatus for generating ozone having, preferably, a first electrode positioned within a channel in a second electrode. The first electrode is a tube made of dielectric material, having at least one electron gun positioned proximate an end thereof for firing electrons. In electrical communication with the electron gun is a rod, maintained in a tube also made of dielectric material, which acts to maintain a constant energy level through the length of the rod. Within the first electrode is an inert gas which, upon the firing of the electron gun, is formed into a plasma. When a feed gas (generally air) is passed between the first and second electrodes, the electrons and plasma cause the formation of ozone. The treated feed gas is then injected into the water to be treated. Preferably, the water is then centrifuged before introduction in the cooling tower system.

61 Claims, 5 Drawing Sheets

SYSTEM AND METHOD FOR TREATING COOLING TOWER WATER

CROSS REFERENCE TO RELATED APPLICATIONS

The contents of the following U.S. patent applications are hereby incorporated by reference: U.S. patent application Ser. No. 09/738,030, filed Dec. 18, 2000 and entitled "Apparatus and Method for Treating Drinking Water", now abandoned; U.S. patent application Ser. No. 09/734,359, filed Dec. 12, 2000 and entitled "Apparatus and Method for Treating Irrigation Water", now U.S. Pat. No. 6,503,402; U.S. patent application Ser. No. 09/734,369, filed Dec. 12, 2000 and entitled "Apparatus and Method for Treating Waste Water", now abandoned; U.S. patent application Ser. No. 09/735,031, filed Dec. 12, 2000 and entitled "Apparatus and Method for Preserving Stored Foods" now U.S. Pat. No. 6,521,859; and U.S. patent application No. 09/734,750, filed Dec. 12, 2000 and entitled "Apparatus and Method for Generating Ozone", now abandoned.

BACKGROUND OF THE INVENTION

Field of Invention

This invention relates generally to systems and methods for treating cooling tower water and, more specifically, to a system and method for treating cooling tower water utilizing a high concentration ozone generation apparatus.

BACKGROUND OF THE INVENTION

Cooling towers are utilized in a variety of processes, such as refrigeration and steam power generation, to remove heat generated by the process. Generally, the cooling tower is part of a system in which water is circulated to a heat exchanger, which is located at a part of a system (for example condenser coils in a large refrigeration system) having heat that needs to be removed. The cooling tower water absorbs the heat at the heat exchanger, and the heated water is then piped to the cooling tower, where it is sprayed into the atmosphere and partially evaporated to liberate the heat, and then recovered and returned at a lower temperature to the system, where the process repeats itself.

Because of minerals, biological contaminants and other matter contained in cooling tower water, cooling tower systems are vulnerable to deposits (scaling), biofouling, and other types of damage. For example, calcium bicarbonate present in water of the type typically used in cooling towers will stay in solution to about 2,000 parts per million (ppm). However, when the water is heated, the calcium bicarbonate becomes calcium carbonate, with carbon dioxide being given off. Calcium carbonate is far less soluble than calcium bicarbonate, and will only stay in solution to about 10 parts per million. (This phenomenon is known as inverse solubility—since it is the reverse of the common principle that solubility generally increases as the temperature of the solution is raised.) Calcium carbonate coming out of solution forms deposits in the system, including in particular at the heat exchanger. The formation of deposits on the heat exchanger will reduce the efficiency of the system.

Biological fouling is also a significant problem. Microbiological contaminants can enter a cooling tower system through the water introduced into the system or by being washed from the air during the cooling process. As these contaminants grow, they can interfere with water flow and/or foul the heat exchanger, restricting heat flow. Such contaminants can also destroy cooling tower lumber. More seriously, such contaminants can be harmful to persons. The most notable example has been outbreaks of Legionnaires' disease, affecting people in hotels, hospitals, office buildings, and other locations, who have come into contact with cooled air from an air conditioning system cooled with contaminated cooling tower water.

A number of methods have been developed to treat cooling tower water, so as to address these and related problems. These generally fall into two categories: chemical addition and bleed-off control. With respect to the former, for example, the problem of hardness has been treated by removing the calcium hardness or scale forming mineral from the water prior to its introduction to the system—with lime soda, ion exchange, or reverse osmosis. Another chemical addition method is to keep scale forming minerals in solution by increasing their solubility through the addition of acid to the water. Still another is to add crystal modifying chemicals that will allow the minerals to precipitate out as a non-adhering sludge instead of as a hard deposit. Biofouling has been addressed with the introduction of chemical biocides into the water, including oxidizing chemicals and industrial poisons. Drawbacks to chemical addition treatment methods include that some of the chemicals used are toxic; a chemical treatment that is effective in dealing with one problem (e.g., increasing alkalinity to control corrosion) can aggravate another problem (e.g., increased alkalinity promotes scaling); and cost.

Bleed-off control, the other basic treatment method, addresses problems associated with impurities in cooling tower water by removing a portion of the water contained in the cooling system so as to reduce the concentration of impurities. However, the increasing cost of water has made it desirable to operate a cooling tower with as little bleed as possible.

In recent years, ozone has attracted attention as a treatment method for cooling tower water. Ozone is an unstable molecule comprised of three atoms of oxygen ($O_3$) having a high oxidation potential. Its ability to purify water and air is well known. It was used to purify drinking water by the latter part of the 1800's, and today is used for this purpose by most major U.S. cities. Ozone has also been utilized for the purification of other types of water, including waste water and irrigation water. Still further, ozone has been used for purifying the air in food storage facilities going back at least as far as 1909.

The basic principles underlying the use of ozone generation are well established. Clean, dry air consists of approximately 78 percent nitrogen gas ($N_2$), approximately 21 percent oxygen gas ($O_2$), and less than one percent of hydrogen ($H_2$) and other gasses. When air (referred to as the "feed gas" in this context) is irradiated using either an ultraviolet source or corona discharge (the acceleration of electrons between two electrodes, separated by a dielectric material, to collide with a feed gas passed therebetween), some of the $O_2$ molecules are split to form two short-lived oxygen atoms. These oxygen atoms combine, almost instantaneously, with uncleaved oxygen molecules to form ozone.

Ozone is not the only product of what is generally referred to herein as an ozonation process; i.e., the irradiation of a feed gas to create ozone and other new compounds. The bombarding of the feed gas with electrons causes the all of the component gasses—and not just the oxygen to rearrange—forming a number of beneficial molecular combinations in addition to ozone. These rearranged molecules include nitrates, nitrites, nitrogen oxides, nitric acid, nitrogen based acids, hydrogen peroxide, hydroperoxide, and hydroxyl radicals (NO, $NO_2$, $NO_3$, $N_2O$, $N_2O_5$, $HNO_2$, $HNO_3$, O, H, OH, $HO_2$, $H_2O_2$).

Ozone and certain of the other atoms and molecules formed as a result of ozonation have a number of beneficial uses in the areas of disinfection and water softening—and are therefore particularly useful in the treatment of cooling tower water.

Ultraviolet radiation is disfavored as a method for generating ozone, due to the inability to produce high quantities of ozone at a relatively low cost in this fashion. As a result, most commercial ozone production is accomplished using a corona discharge type of ozone generator.

However, there are numerous problems with prior art corona discharge ozone generators, and thus limitations on their suitability for use in a system and method for treating cooling tower water. Thus, when the feed gas is passed between the electrodes, water or dust present in the feed gas attach themselves to the dielectric surrounding the cathode. These spots tend to attract electrons, with the result that hot spots are formed on the surface of the dielectric—leading eventually to the burning through of the dielectric and consequent failure of the generation apparatus. In the commercial area, ozone generators require constant servicing and, indeed, rebuilding, because of such problems. In the City of Los Angeles, for example, high concentration ozone generators used to treat the city's drinking water are presently required to be rebuilt after approximately ten days of use—a rate that is plainly undesirable. Moreover, prior art devices do not permit the ready manipulation of the ozonation products, for example to produce more ozone and less nitrogen-containing compounds or more nitrogen-containing products and less ozone.

Still further, prior art systems for treating cooling tower water based on ozonation do not utilize a centrifuge to further assist in the process of removing separated materials, resulting in a less efficient process.

U.S. Pat. No. 4,954,321, issued to the applicant herein, illustrates a plasma corona discharge apparatus, representing an improvement upon the basic corona discharge process. Generally, a plasma corona discharge apparatus is similar to a non-plasma apparatus, except that in a plasma apparatus, an inert gas is inserted into an elongated, insulated, sealed cathode, into which electrons are fired for the ozonation process. That gas performs two functions. First, it generally precludes the formation of hot spots and resulting dielectric burn-through and generator failure through a convection process. In this regard, the inert gas, which has become a plasma by virtue of the electrons passing therethrough, becomes attracted to a water or dust spot, the gas becomes heated and then rises away from the hot spot, to be replaced by gas having a lower temperature. This results in a relatively constant movement of the gas and substantially reduces overheating and/or apparatus failure attributable to the formation of stable hot spots.

The second function of the inert gas is to directly assist in the efficiency of the ozonation process. In this regard, upon the firing of electrons from an electron gun into the inert gas, a plasma is formed within the cathode (i.e., on the inside of the dielectric), and also outside of the dielectric. The passage of electrons though this plasma and into the feed gas causes oxygen disassociation and reformation as ozone at an improved rate over non-plasma devices.

However, even the plasma device illustrated in U.S. Pat. No. 4,954,321, while more reliable than prior art devices, suffers from important limitations and deficiencies. For example, the energy produced by the electron gun firing into the cathode is concentrated near the electron gun, and gradually dissipates over the length of the electrode. This results in a decrease in the effectiveness of this particular prior art apparatus in treating the feed gas, and thus in the production of a lower concentration of ozone than is possible if the energy level could be maintained constant throughout the length of the cathode.

A need therefore existed for an improved system and method for treating cooling tower water, based on an ozone generator apparatus and method capable of reliably generating high concentrations of ozone (and other ozonation products) suitable for use in such treatment. The improved system and method should provide for the maintenance of a relatively constant energy level throughout the length of the energy-producing electrode, so as to provide more efficient production of ozonation products. The improved system and method should also provide for the efficient adjustment of the products of ozonation, so that ozone or nitrogen-containing products can be favored. The improved system and method should further utilize a centrifuge, to further assist in the process of removing separated materials. The present invention satisfies these needs and provides other, related, advantages.

SUMMARY OF THE INVENTION

It is an object of the present invention to provide an improved system and method for treating cooling tower water with ozone and other atoms and molecules formed from the bombardment of a feed gas with electrons.

It is an object of this invention to provide an improved system and method for treating cooling tower water with ozone and other atoms and molecules formed from the bombardment of a feed gas with electrons, wherein the system and method have a reduced risk of failure as compared to prior art systems and method based on corona discharge apparatuses.

It is a further object of this invention to provide an improved system and method for treating cooling tower water with ozone and other atoms and molecules formed from the bombardment of a feed gas with electrons capable of producing a higher concentration of ozone than prior art systems and methods based on corona discharge apparatuses by, among other things, providing for a substantially constant energy level throughout the length of the first electrode in the apparatus used in the system and method of the present invention.

It is a still further object of this invention to provide an improved system and method for treating cooling tower water with ozone and other atoms and molecules formed from the bombardment of a feed gas with electrons which system and method may be readily adjusted to alter the relative quantities of atoms and molecules produced from the bombardment, so as to optionally produce more oxidizing compounds or more nitrogen containing compounds.

BRIEF DESCRIPTION OF THE PREFERRED EMBODIMENTS

In accordance with one embodiment of the present invention, a system for treating cooling tower water is disclosed. The system comprises, in combination: an apparatus for bombarding a feed gas with electrons to generate ozone and other atoms and molecules comprising: a first electrode; wherein the first electrode comprises: an electron gun coupled to a power source and located proximate one end of the first electrode; a rod in electrical communication with the electron gun; a first tube of dielectric material disposed along a length of the rod; a second tube of dielectric material dimensioned to receive therein the first tube; wherein the second tube is substantially sealed; and an inert gas disposed within each of the first tube and the second tube; a second electrode containing a channel dimensioned to receive therein the first electrode so that sufficient space is present between the first electrode and the second electrode that a feed gas may be passed through the channel along an exterior surface of the first electrode; a feed gas inlet coupled to the second electrode and wherein the feed gas inlet is in communication with the channel; and a feed gas outlet coupled at a first end thereof to the second electrode and wherein the feed gas outlet is in communication with the channel; and an injector coupled to the feed gas outlet.

In accordance with another embodiment of the present invention, a system for treating cooling tower water is disclosed. The system comprises, in combination: an apparatus for bombarding a feed gas with electrons to generate ozone and other atoms and molecules comprising: a first electrode comprising a substantially sealed tube of dielectric material; wherein the first electrode further comprises: a first electron gun coupled to a power source, located proximate one end of the first electrode, and adapted to fire electrons into the substantially sealed tube of dielectric material; a second electron gun coupled to a power source, located proximate a second end of the first electrode, and adapted to fire electrons into the substantially sealed tube of dielectric material; and an inert gas disposed within the substantially sealed tube of dielectric material; a second electrode containing a channel dimensioned to receive therein the first electrode so that sufficient space is present between the first electrode and the second electrode that a feed gas may be passed through the channel along an exterior surface of the first electrode; a feed gas inlet coupled to the second electrode and wherein the feed gas inlet is in communication with the channel; a feed gas outlet coupled at a first end thereof to the second electrode and wherein the feed gas outlet is in communication with the channel; and an injector coupled to the feed gas outlet.

In accordance with still another embodiment of the present invention, a system for treating cooling tower water is disclosed. The system comprises, in combination: an apparatus for bombarding a feed gas with electrons to generate ozone and other atoms and molecules; an injector coupled to the apparatus and adapted to inject the feed gas into cooling tower water; a centrifuge coupled to the injector and adapted to centrifuge the cooling tower water following the injection of the feed gas into the water; and wherein the centrifuge is coupled to a cooling tower system.

In accordance with yet another embodiment of the present invention, a method for treating cooling tower water is disclosed. The method comprises the steps of: providing an apparatus for bombarding a feed gas with electrons to generate ozone and other atoms and molecules comprising: a first electrode; wherein the first electrode comprises: an electron gun coupled to a power source and located proximate one end of the first electrode; a rod in electrical communication with the electron gun; a first tube of dielectric material disposed along a length of the rod; a second tube of dielectric material dimensioned to receive therein the first tube; wherein the second tube is substantially sealed; and an inert gas disposed within each of the first tube and the second tube; a second electrode containing a channel dimensioned to receive therein the first electrode so that sufficient space is present between the first electrode and the second electrode that a feed gas may be passed through the channel along an exterior surface of the first electrode; a feed gas inlet coupled to the second electrode and wherein the feed gas inlet is in communication with the channel; and a feed gas outlet coupled at a first end thereof to the second electrode and wherein the feed gas outlet is in communication with the channel; providing an injector coupled to the feed gas outlet; providing power from the power source to the electron gun; passing a feed gas into the feed gas inlet, through the channel, and out of the feed gas outlet; and injecting the feed gas passing out of the feed gas outlet into cooling tower water.

In accordance with another embodiment of the present invention, a method for treating cooling tower water is disclosed. The method comprises the steps of: providing an apparatus for bombarding a feed gas with electrons to generate ozone and other atoms and molecules; providing an injector coupled to the apparatus and adapted to inject the feed gas into cooling tower water; providing a centrifuge coupled to the injector and adapted to centrifuge the cooling tower water following the injection of the feed gas into the cooling tower water; bombarding the feed gas with electrons; injecting the bombarded feed gas with the injector into the cooling tower water; centrifuging the cooling tower water in the centrifuge; removing from the cooling tower water in the centrifuge separated materials; and passing the cooling tower water into a cooling tower system.

The foregoing and other objects, features, and advantages of the invention will be apparent from the following, more particular, description of the preferred embodiments of the invention, as illustrated in the accompanying drawings.

DETAILED DESCRIPTION OF THE PREFERRED EMBODIMENTS

Figures 1, 2, 3:
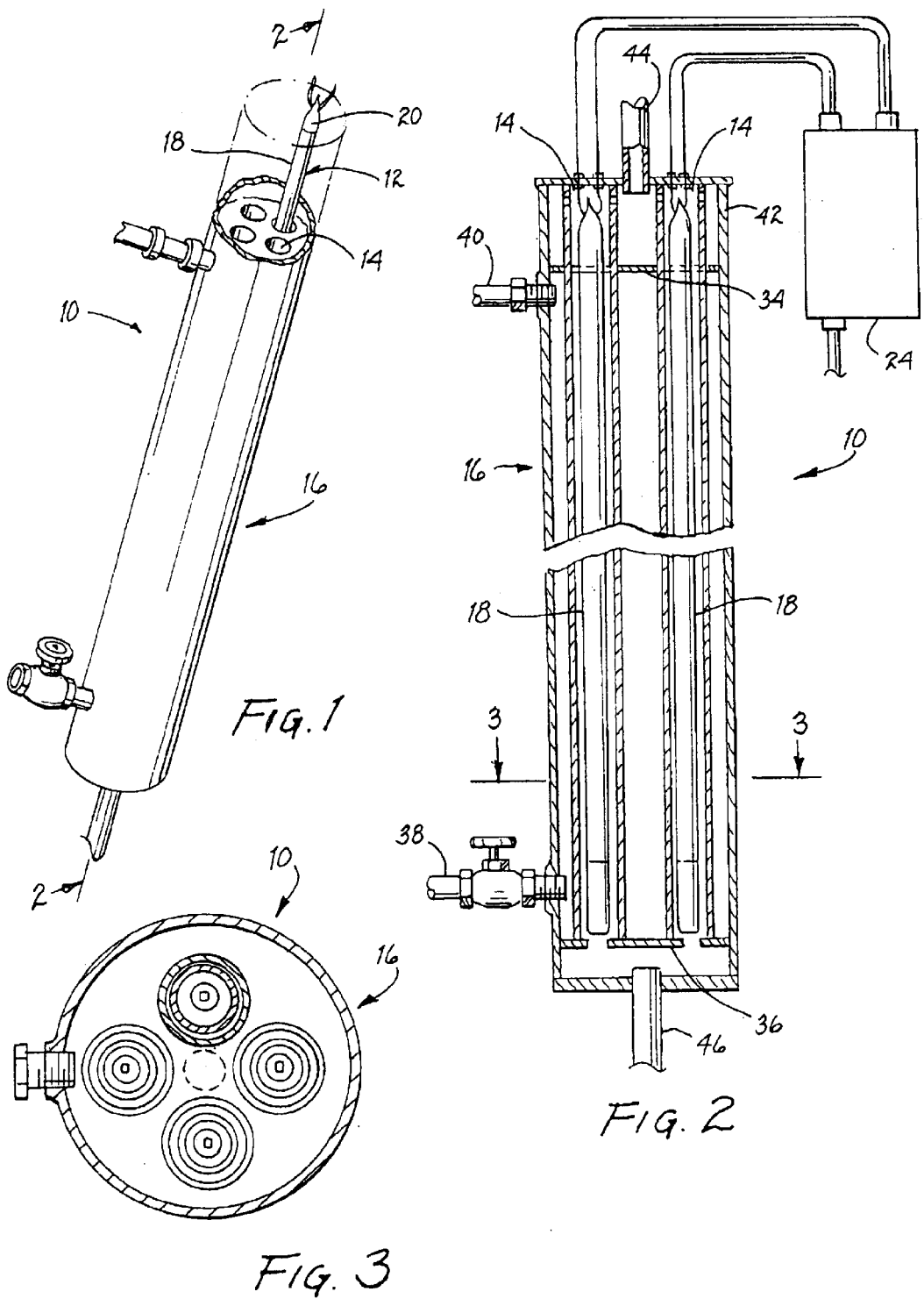
FIG. 1 is a perspective view of one embodiment of an ozone generation apparatus utilized in the system and method of the present invention.
FIG. 2 is a side cross-sectional view of the apparatus of FIG. 1, taken along line 2—2.
FIG. 3 is a top cross-sectional view of the apparatus of FIG. 1, taken along line 3—3 of FIG. 2.

Ozone treatment of cooling tower water can substantially ameliorate the major problems associated with hardness and contamination, including biofouling and scaling.

Turning first to biofouling, ozone, an electron deficient molecule, is a very powerful oxidizing agent (i.e., a chemical species that gains electrons during a chemical reaction.) The oxidation potential of ozone follows only that of fluorine, atomic oxygen and hydroxyl radicals, and substantially exceeds that of chlorine, a chemical widely used in water treatment. (Fluorine and atomic oxygen are not routinely used as oxidants. While hydroxyl radicals are also not routinely put to such use, they are not—unlike fluorine, for example—unduly dangerous for such use and a process that creates sufficient hydroxyl radicals for use in a treatment process would be highly beneficial.) Thus, ozone has been shown to have greater ability to kill microbiological contaminants than hypochlorous acid and hypochlorite ion, the two forms of chlorine in water at typical pH values. Indeed, ozone has been shown to be able to disinfect water containing cystic material —e.g., *Giardia lamblia*—which is unaffected by chlorine.

Ozone possesses other qualities that can make it preferable to chlorine and other chemicals commonly used in water treatment processes. First, ozone does not affect the pH of the water that it is used to treat. As a result, the use of ozone in a water treatment process will not tend to make the treated water any more scale causing or corrosive—unlike chlorine and other treatment chemicals. Relatedly, ozone completely oxidizes metal surfaces—such as those commonly present in a cooling tower system, providing a covering surface that protects the metal from further rusting or corroding. In comparison, chlorine, for example, can have a significant corrosive effect on metal surfaces.

Another advantage possessed by ozone versus chlorine and other chemicals used in water treatment is that it does not lead to the formation of any undesirable reaction byproducts, with any unused ozone quickly reverting back to oxygen gas ($O_2$). The undesirable reaction byproducts of other treatment chemicals, such as the chlorides produced when chlorine is used as an oxidant in a wet scrubber, are potentially harmful to the environment.

Still further advantages associated with ozone versus other treatment chemicals include that ozonation generally requires a shorter reaction time than other treatment chemicals. Ozone is highly water soluble—approximately ten times more than oxygen gas—and yet because of its highly unstable nature quickly reverts back to oxygen. Thus, the ozone will quickly enter the water to be treated, react, and revert back to oxygen. As a result, a treatment process involving ozonation is generally faster than a treatment process involving other treatment chemicals such as chlorine.

Unlike most chemicals used for water treatment, including particularly chlorine, ozone cannot be packaged or stored. It decomposes relatively quickly in dry air and even more rapidly in solution. Therefore, ozone that is to be used in water or other treatment processes must be generated on site and used immediately. This can be both a disadvantage and an advantage. On the one hand, the use of ozonation requires the maintenance of an ozone generation capability at the water treatment site, something not required with other treatments. On the other hand, the need to transport potentially dangerous chemicals and the risks associated with such transportation are eliminated.

Certain of the other products of the corona discharge process, including hydrogen peroxide and hydroxyl radicals, are also oxidizing agents and supplement the oxidative effect of ozone on molecules present in the treated water.

As discussed above, the improved corona discharge process of the present invention also produces in the feed gas a number of nitrogen containing molecules. These molecules, as well as ozone and certain of the other products of the corona discharge/plasma process, also play an important role in the treatment process. Thus, the nitric acid, nitrous acid, and oxalic acid in the treated water change calcium carbonate present in the cooling tower water to bicarbonate, which is up to 2,000 times more soluble in water. (The oxalic acid is produced by the oxidation of organics present in the treated water by ozone and hydrogen peroxide, while the nitric and nitrous acids are direct products of the treatment of the feed gas using the apparatus of the present invention.) The increased solubility of bicarbonate over calcium carbonate reduces water hardness and thus scaling.

*Turning to the apparatus 10 to be used for treating cooling tower water, and referring first to FIGS. 1–6, the apparatus 10 comprises, generally, at least one and preferably a plurality of electrodes 12 maintained in channels 14 within an anode 16. The electrodes 12, in turn, comprise an outer sealed tube 18, made of a dielectric material and substantially hermetically sealed. The material of the outer sealed tube 18 is preferably leaded glass or pyrex, although other dielectric materials could be used without departing from the spirit or scope of the present invention. At an upper portion of the outer sealed tube 18 is positioned an electron gun 20. The electron gun 20 may be of any desired size and of any type having the desired output. Preferably, the electron gun 20 is of the Philips TC series, and preferably is a Philips T19C, having a diameter of 19 mm. The Philips TC series is preferred for the electron gun 20 because of the presence at a bottom portion thereof of a ceramic ring 22, which ceramic ring 22 is able to better withstand the significant heat or sputtering created at the bottom portion of the electron gun 20 during operation of the apparatus 10 —heat that otherwise could be sufficient to cause damage to the electron gun 20 through sputtering over time.

Each electron gun 20 is coupled to a power source 24. The power source may have any desired voltage consistent with the use to which the apparatus 10 is to be placed. Generally, the power source 24 should have a voltage of at least 1,000 volts, with a voltage of 10,250 preferred. During operation, and because the electrode 12 acts as a capacitor when electricity is passed therethrough, secondary voltage discharges in the range of approximately 100,000 volts are produced. Because of the occurrence of such secondary discharges, the power source 24 should be non-current limited so as to prevent failure during the occurrence of a secondary discharge.

Figure 4:
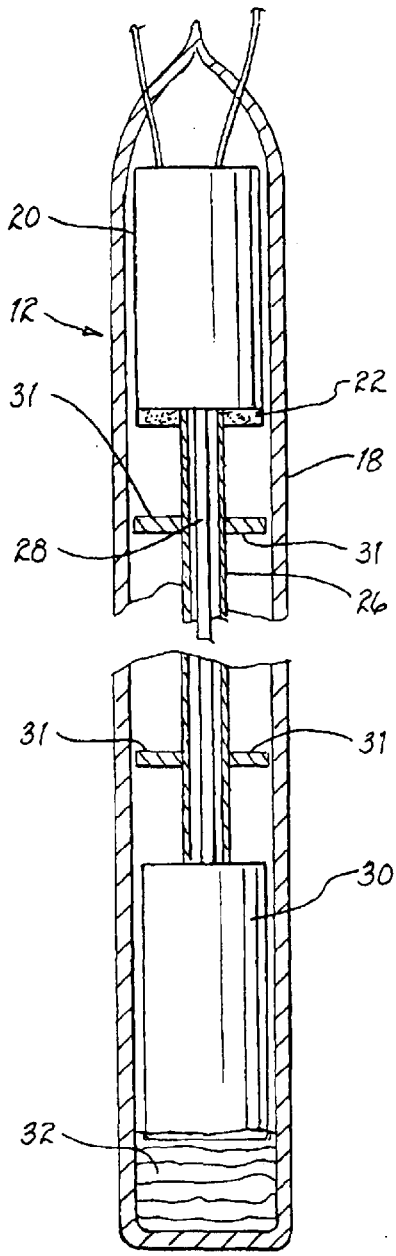
FIG. 4 is a side cross-sectional view of the first electrode in an embodiment of an ozone generation apparatus utilized in the system and method of the present invention, illustrating a configuration in which there is no gap between the rod and the electron gun.
Figure 5:
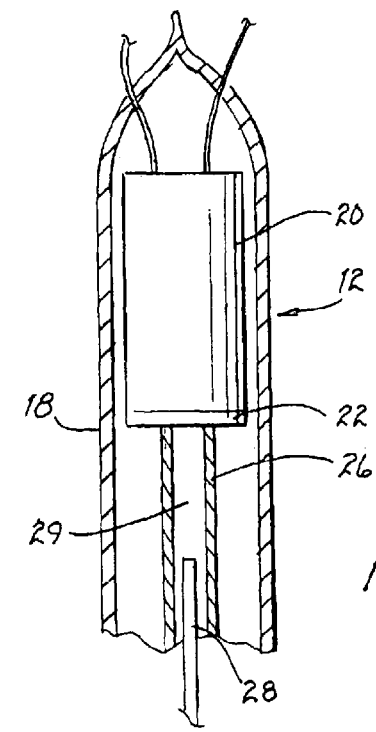
FIG. 5 is a side cross-sectional view of the first electrode in an embodiment of an ozone generation apparatus utilized in the system and method of the present invention, illustrating a configuration in which there is a gap between the rod and the electron gun.
Figure 6:
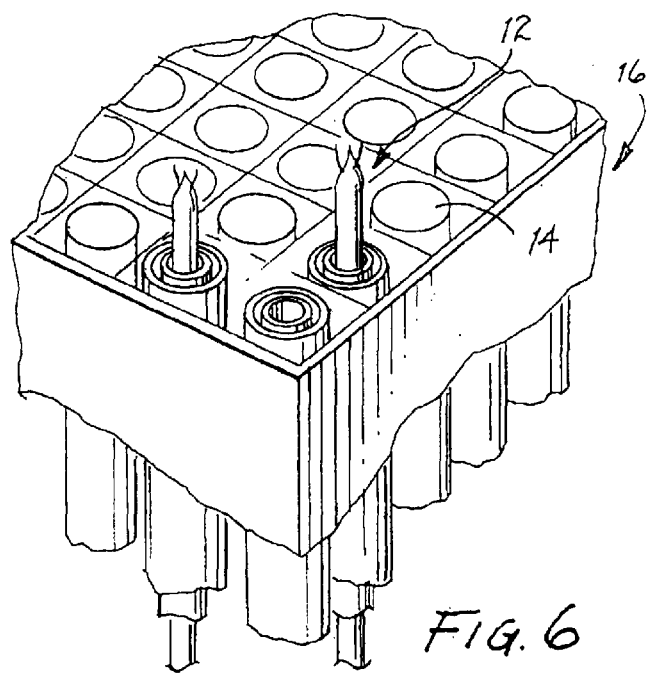
FIG. 6 is a perspective view of another embodiment of an ozone generation apparatus utilized in the system and method of the present invention, illustrating a configuration having numerous first electrodes.

Referring specifically to FIGS. 4–5, inserted into the electron gun 20 is an inner tube 26, also made of a dielectric material. Like the outer sealed tube 18, the inner tube 26 is preferably made of leaded glass or pyrex, although other dielectric materials could be used without departing from the spirit or scope of the present invention. Positioned within the inner tube 26 is a rod 28. The rod 28 can be made of any metal, including aluminum, stainless steel or tungsten. Superior results have been obtained with aluminum. In one embodiment, the rod 28 extends into the electron gun 20. In the preferred embodiment, a gap 29 is created between the rod 28 and the electron gun 20. The purpose of the gap 29 is to create an increase in voltage from the power source 24—potentially more than a ten-fold increase—when the electricity jumps from the electron gun 20 to the rod 28. This increase in voltage results in an increase in the number of electrons generated and thus increases the efficiency of the ozonation process. Gaps of one-half inch and one inch have been shown to produce good results, although gaps of other lengths would be possible. Whether or not the gap 29 is present, the rod 28 maintains a substantially constant level of energy throughout its length.

Figure 10:
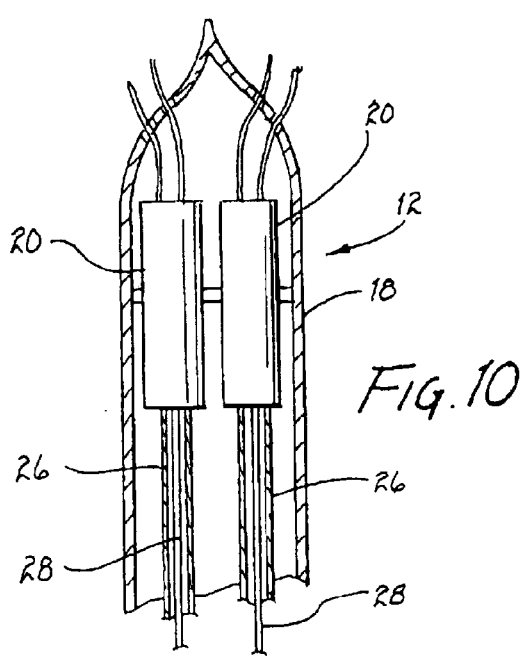
FIG. 10 is a side view of another embodiment of an electrode in the apparatus utilized in the system and method of the present invention, illustrating a plurality of electron guns.
Figure 12:
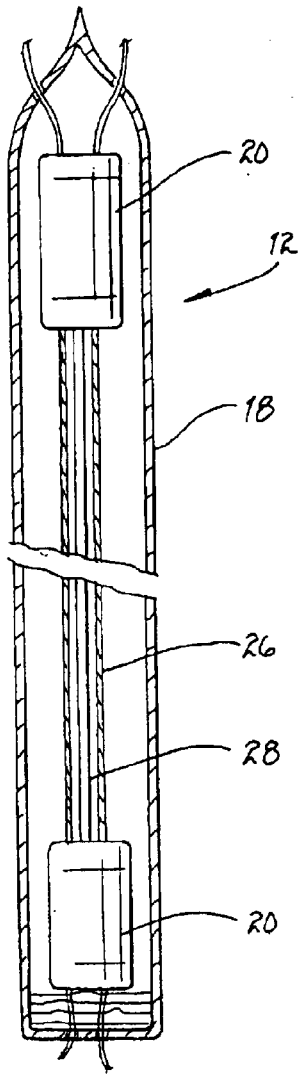
FIG. 12 is a side view of another embodiment of an electrode in the apparatus utilized in the system and method of the present invention, in which an electron gun is positioned on both ends of the electrode.
Figure 11:
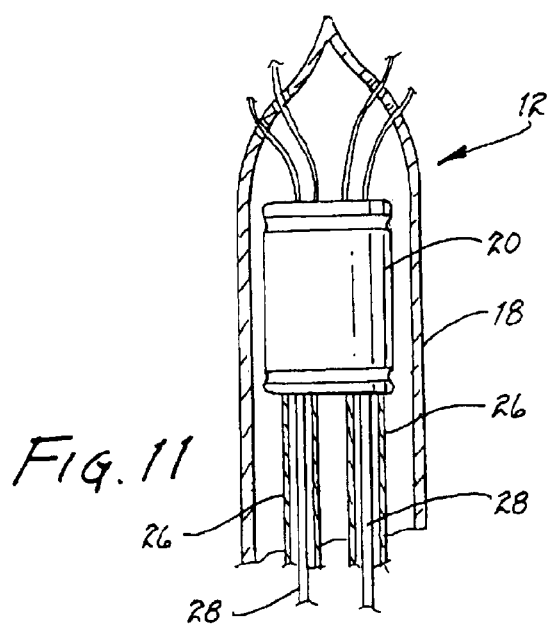
FIG. 11 is a side view of another embodiment of an electrode in the apparatus utilized in the system and method of the present invention, illustrating an electron gun having a plurality of rods therein.

It should be noted that while the electron gun 20 is preferably positioned within the outer sealed tube 18 at an upper portion thereof, it would be possible, without departing from the spirit or scope of the present invention, to position the electron gun 20 outside of the outer sealed tube 18. In such a configuration, the rod 28 and inner tube 26 would extend through a sealed opening in the outer sealed tube 18 so as to receive a flow of electrons from the electron gun 20. Moreover, and referring specifically to FIG. 12, while a single electron gun 20 positioned at a top portion of the electrode 12 is preferred, it would be possible to position an electrode 12 at a bottom portion of the electrode 12 at the other end of the rod 28—either in place of or in addition to the electron gun 20 positioned at the top of the electrode 12. Moreover, and referring now to FIG. 10, while a single electron gun 20 is shown in FIGS. 1, 2, 4 and 5, a plurality of electron guns 20 could be positioned at an end of the electrode 12 (or at both ends) to increase the output of the apparatus 10. (Indeed, the positioning of electron guns 20 at both ends of the electrode 12, even without the addition of the rod 28 and inner tube 26, would result in an increased yield over prior art devices.) Still further, and referring now to FIG. 11, with each electron gun 20 used, it would be possible to provide a plurality of rods 28. As shown in FIG. 11, each rod 28 could have its own inner tube 26 or, optionally, the rods 28 could be housed in a single inner tube 26.

The purpose of the inner tube 26 is prevent the creation of excess heat along the rod 28. But for the presence of the inner tube 26, heat generated by the rod 28 could burn through the outer sealed tube 18, causing the electrode 12 to fail.

The apparatus of the present invention improves upon the basic corona discharge process in a number of ways. These include the addition of the rod 28, which operates as discussed herein to allow for a substantially even amount of energy to be discharged throughout the length of the outer sealed tube 18. Without the rod 28, energy would be concentrated near the electron gun 20 and would gradually dissipate over the length of the electrode 12, reducing the effectiveness of the apparatus in treating the feed gas. Yet the addition of the rod 28 and the benefits that it confers is only made possible with the surrounding of the rod 28 with the inner tube 26—which acts to prevent the creation of excess heat along the rod 28. Still further, the use of an inert gas inside both the inner tube 26 and outer sealed tube 18, as described herein, acts as a coolant to prevent overheating of the electrode 12 during operation—substantially increasing the reliability and survivability of the apparatus 10 over prior art corona discharge ozone generators. Referring now to FIG. 4, in order to prevent the bottom of the inner tube 26 from contacting the bottom of the outer sealed tube 18 and thus causing arcing between the bottoms of the tubes 26 and 18 during operation of the electrode 12, a mini-tube 30 is preferably positioned around the bottom of the inner tube 26. The mini-tube 30, in combination with the electron gun 20, further acts to center the inner tube 26 throughout its length. (Preferably, additional centering—particularly where the electrode 12 is to be used in an angled generator—may be provided in the form of mica or other inserts 31 positioned between the inner tube 26 and the outer sealed tube 18.) The mini-tube 30 is also comprised of a dielectric material, including optionally ceramic, leaded glass, or pyrex. The mini-tube 30 is preferably open on both sides thereof. On the first side, it receives the inner tube 26. On the second side, it contacts a shock-absorber 32, which is positioned below the mini-tube 30, both to reduce the possibility of damage during movement of the electrode 12, particularly during insertion of the electrode 12 into a channel 14 in an anode 16, and to prevent the tubes 26 and 18 from contacting one another. The shock-absorbing material forming the shock-absorber 32 could be any desired material providing the desired shock-absorbing effect without interfering with the operation of the electrode 12, including for example fiberglass. It would be possible, without departing from the spirit or scope of the present invention, to eliminate the shock-absorber 32, and instead to close the second end of the mini-tube 30 so as to prevent the tubes 26 and 18 from contacting one another. As an additional alternative, it would be possible to seal the end of the inner tube 26 opposite the electron gun 20 and extend it to the bottom of the outer sealed tube 18.

Referring to FIG. 2, the electrode(s) 12 is dimensioned to be positioned within an anode 16, and specifically within a channel 14 in the anode 16. The channel 14 has a greater internal diameter than the external diameter of the electrode 12, so as to permit the air to be treated (the "feed gas") to pass through the channel 14 around the electrode 12. The channels 14 are positioned within the anode 16 with an upper plate 34 and a lower plate 36, so that the channels 14 open at a top portion thereof at the upper plate 34 and at a bottom portion thereof at the lower plate 36. The areas of contact between the channels 14 and the upper and lower plates 34 and 36 are preferably sealed against the passage of liquids, so as to permit the passage of a coolant between the upper and lower plates 34 and 36 and around the channels 14. The purpose of the coolant, in combination with the gasses contained in the electrodes 12 as discussed below, is to prevent overheating during operation of the electrodes 12. The coolant is preferably water—although other coolants, including for example glycol, may be used—and preferably enters the anode 16 through an inlet 38 proximate the lower plate 34 and exits the anode 16 through an outlet 40 proximate the upper plate 36.

The length of the anode 16 is preferably sufficient so that, when the electrodes 12 are positioned within the channels 14, the top, electron gun 20-containing portion of the electrode 12—which will extend above the upper plate 34—is within the outer wall 42 of the anode 16. The outer wall 42 should be of sufficient distance from the electrode 12 so as to prevent arcing between the two. A distance of approximately three inches is sufficient for certain applications.

Both the outer sealed tube 18 and the inner tube 26 have a substantially inert gas or gasses therein, including at least one noble gas. The gas acts as a coolant, by preventing through convection the overheating of the electrode 12 during operation and/or the damaging of the electrode 12 caused by electrons burning through the outer sealed tube 18. Because heated gasses will rise, the heat generated by the operation of the electrode 12 will tend to move away from a hot spot and rise along the electrode 12, until arriving at the portion of the electrode 12 positioned above the upper plate 34—an area that is maintained at a lower temperature than in the channels 14. The heated gas, which is formed into a plasma, will then cool and be replaced in this portion of the electrode 12 by hotter gasses, resulting in relatively constant movement of the gas and substantially reducing overheating and/or damaging of the electrode 12 during operation through the formation of stable hot spots.

This construction also allows the apparatus 10 of the present invention to operate at substantially higher temperatures than prior art high concentration ozone generators, without experiencing damage. (A high concentration ozone generator is generally considered to be one having an air output that contains at least approximately one percent by weight ozone.) While a typical prior art high concentration generator cannot be operated above approximately seventy-two degrees Fahrenheit, the apparatus 10 of the present invention can be operated at temperatures in the area of one hundred twenty five degrees Fahrenheit and perhaps greater without damage to the apparatus 10.

The reduction of overheating and damage to the electrode 12 provides substantial benefit over prior art high concentration ozone generators. Prior art generators have an extremely poor survival rate—requiring repair and/or rebuilding on a frequent basis. In the City of Los Angeles, for example, high concentration ozone generators used to treat the city's drinking water are required to be rebuilt approximately after only ten days of use—a rate that is plainly undesirable. The apparatus 10 of the present invention, in contrast, does not require rebuilding after short periods of use—and thus is substantially more reliable and has substantially greater survivability than prior art high concentration generators.

Located in the anode 16, above the upper plate 36, is an air inlet valve 44. Preferably a filter (not shown) is located within the inlet valve 44, so as to prevent dirt and other impurities from entering the apparatus 10. A five micron filter has been shown to be effective, but other size filters may be provided. The air need not be provided under pressure but instead, may be drawn through the system through an air outlet valve 46 located below the lower plate 34. Alternatively, the air may be provided through the air inlet valve 44 under pressure. From the air outlet valve 46, the air is transported away from the apparatus 10 and is placed into the cooling tower water 45—preferably using an injector 47—to be treated using the apparatus 10.

During operation of the apparatus 10, power is supplied to the electron guns 20 using the power source 24. Electrons will flow from the electron guns 20 to the rod 28, passing over the gap 29 in the embodiment shown in FIG. 5. The electrons will flow down the length of the rod 28, will jump from the rod 28 to the inner tube 26, will jump from the inner tube 26 to the outer sealed tube 18, and will jump from the outer sealed tube 18 to the wall of the channel 14; i.e., to ground. The use of the rod 28 allows the for a substantially even amount of energy to be discharged throughout the length of the outer sealed tube 18. Without the rod 28, energy would be concentrated near the electron gun 20 and would gradually dissipate over the length of the electrode 12, reducing its effectiveness. The electrons passing out of the outer sealed tube 18 will act on the air passing through the channels 14, causing the air to disassociate and causing the production of a number of desirable products. These include but are not limited to nitrates, nitrites, nitrogen oxides, nitric acid, nitrogen based acids, hydrogen peroxide, hydroperoxide, ozone, and hydroxyl radicals (NO, $NO_2$, $NO_3$, $N_2O$, $N_2O_5$, $HNO_2$, $HNO_3$, O, $O_3$, H, OH, $HO_2$, $H_2O_2$). The ozonated air is then injected into water to be treated using the apparatus 10.

The types of desirable products created during the operation 10 is subject to adjustment. Thus, as discussed above, a coolant, preferably water, is passed between the upper and lower plates 34 and 36 and around the channels 14 during operation of the apparatus 10—to prevent overhearing during operation of the electrodes 12. Additionally, depending on its temperature, the coolant acts to regulate the make-up of the products produced in the air as it passes through the channels 14. Thus, by adjusting the temperature of the coolant so that the temperature of the coolant as it exits through the outlet 40 is below ninety degrees Fahrenheit, with an exit temperature in the range of approximately eighty-five degrees Fahrenheit preferred, the production of nitrates and other nitrogen containing products can be decreased and the production of ozone and hydrogen peroxide can be increased. By adjusting the temperature of the coolant so that the temperature of the coolant as it exits through the outlet 40 is between approximately ninety degrees and one hundred and five degrees Fahrenheit, nitrate production (and the production of other nitrogen containing compounds) can be increased and the production of ozone and hydrogen peroxide can be decreased.

Figure 7:
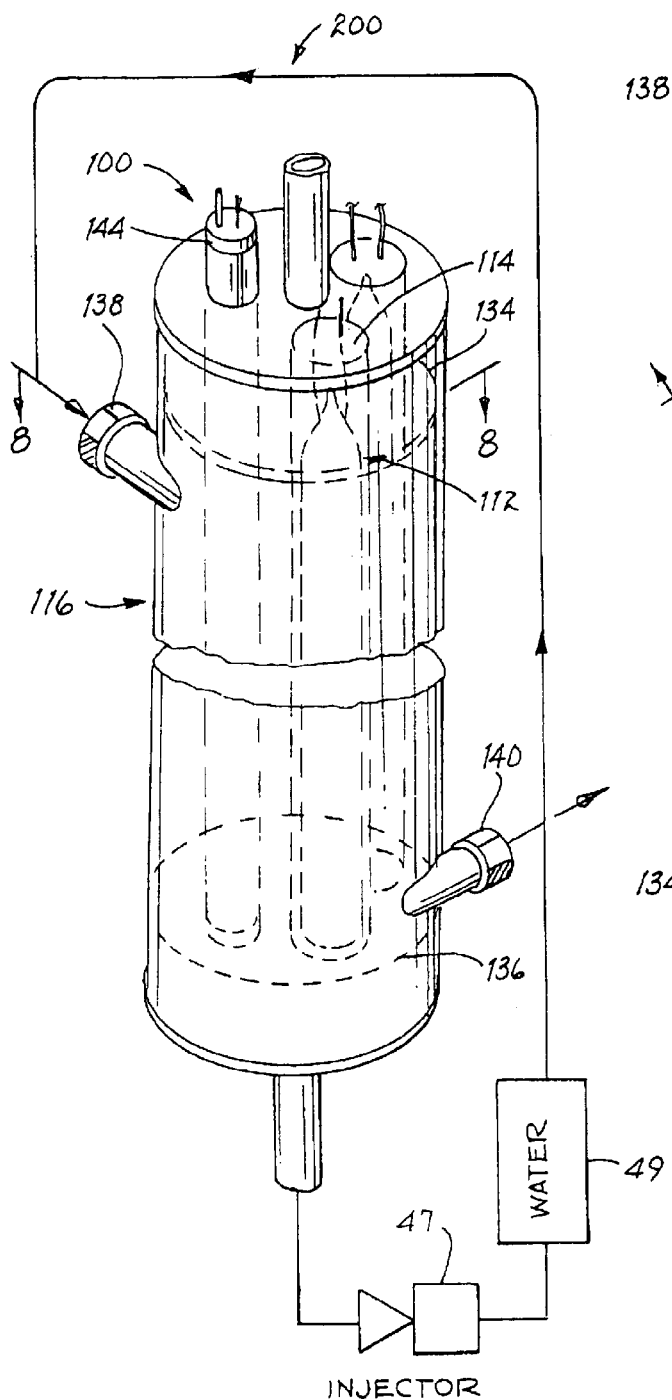
FIG. 7 is a perspective, cut-away view of another embodiment of the apparatus utilized in the system and method of the present invention, having an ultraviolet light source.
Figure 8:
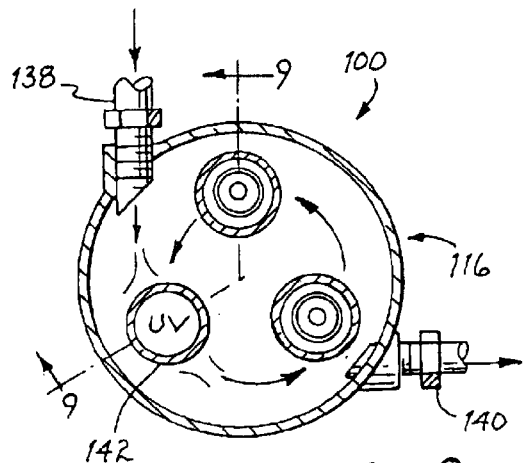
FIG. 8 is a top, cross-sectional view of the apparatus of FIG. 7, taken along line 8—8.
Figure 9:
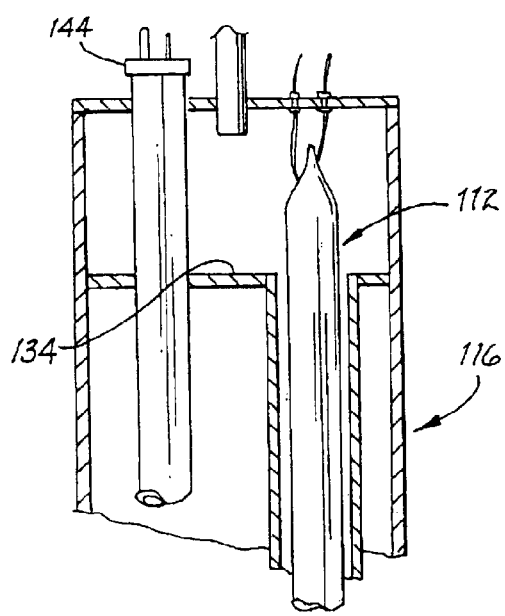
FIG. 9 is a side view of the apparatus of FIG. 7, taken along line 9—9 of FIG. 8.

The products of ozonation can be adjusted in another manner. Referring now to FIGS. 7–9, another embodiment of the apparatus 10 of the present invention—herein the apparatus 100—is shown. This embodiment involves the exposure of water injected with ozonated air to ultraviolet light at a wavelength of approximately 254 nanometers, a process that creates hydroxyl radicals in the treated water and that thus produces an oxidant that can be as much as 100,000 times more powerful than non-UV-exposed ozone. This more powerful oxidant is particularly effective in destroying man-made organic compounds, many of which have carcinogenic properties.

Referring first to FIG. 7, the apparatus 100 is shown and described. The apparatus 100 comprises at least one (and preferably at least two) electrodes 112 maintained in channels 114 within an anode 116. The channels 114 are positioned within the anode 116 with an upper plate 134 and a lower plate 136. The construction and operation of the electrodes 112, channels 114, upper plate 134 and lower plate 136, is as described above with respect to the electrodes 12, the channels 14, the upper plate 34 and the lower plate 36. With respect to the anode 116, it differs from anode 16 described above with respect to the cooling system. First, the coolant used is ozonated water (i.e., water injected with ozonated air produced by an ozone generator, such as the apparatus 100 itself), which is routed back into the anode 116 through an inlet 138 proximate the upper plate 134 and which exits the anode 116 through an outlet 140 proximate the lower plate 136. Moreover, as shown in FIG. 8, the inlet 138 is angled so that as the coolant enters the anode 116, it strikes the interior wall of the anode 116 (as opposed to, for example, directly striking a channel 114), so that the coolant swirls through the interior of the anode 116 as it proceeds toward the outlet 140.

Referring to FIGS. 7–9, the anode 116 further includes a single quartz well 142, through which an ultraviolet light source may be passed. The quartz well may be of any suitable type, including for example model GE214L manufactured by General Electric®. An ultraviolet light 144, producing ultraviolet light at a wavelength of approximately 254 nanometers, is positioned within the quartz well 142. (As shown in FIG. 7, the preferred ratio of electrodes 112 to ultraviolet lights 144 is two to one, although improved results over the prior art can be obtained from a higher or lower ratio of electrodes 112 to ultraviolet lights 144.) As the coolant (ozonated water) is swirled through the interior of the anode 116 as described above, it will be exposed to the ultraviolet light 144, causing the production of hydroxyl radicals and an increased oxidizing capability.

As shown in FIG. 7, the apparatus 100 is preferably part of a closed system 200, in which ozonated feed gas generated by the apparatus 100 is injected with an injector 47 into water 49, which ozonated water 49 is then routed back through the apparatus 100 to cool the apparatus 100 and to be exposed to ultraviolet light. Alternatively, it would be possible to provide an ozone generator that is one of the embodiments of the apparatus 10 described above, to ozonate feed gas in the manner described above, to inject that ozonated feed gas into water, and to then expose that ozonated water to a separate ultraviolet light source.

The adjustability of the apparatus 10 with respect to the components produced is of particular benefit in the treatment of cooling tower water, given the difference in quality in the types of water used in cooling towers. Thus, cooling tower water could be particularly hard, creating a desire to increase the production of those compounds that would reduce hardness. On the other hand, cooling tower water may have particularly high quantities of biological contaminants—for example where it is recycled waste water—creating a desire to increase the production of oxidizing compounds.

Indeed, in this regard, it will sometimes be beneficial to treat water more than one time using the apparatus 10 of the present invention. For example, in the first treatment, ozone rich feed gas could be used to disinfect the water. In the second treatment, nitrogen rich feed gas could be used to make the water softer, so as to limit scaling. Or, the water can be treated more than once with feed gas having the same make-up, to more efficiently impart the desired benefit. Still further, the apparatus 10 of the present invention could be used in combination with other, prior art, treatment methods.

Operation of the System

Figure 13:
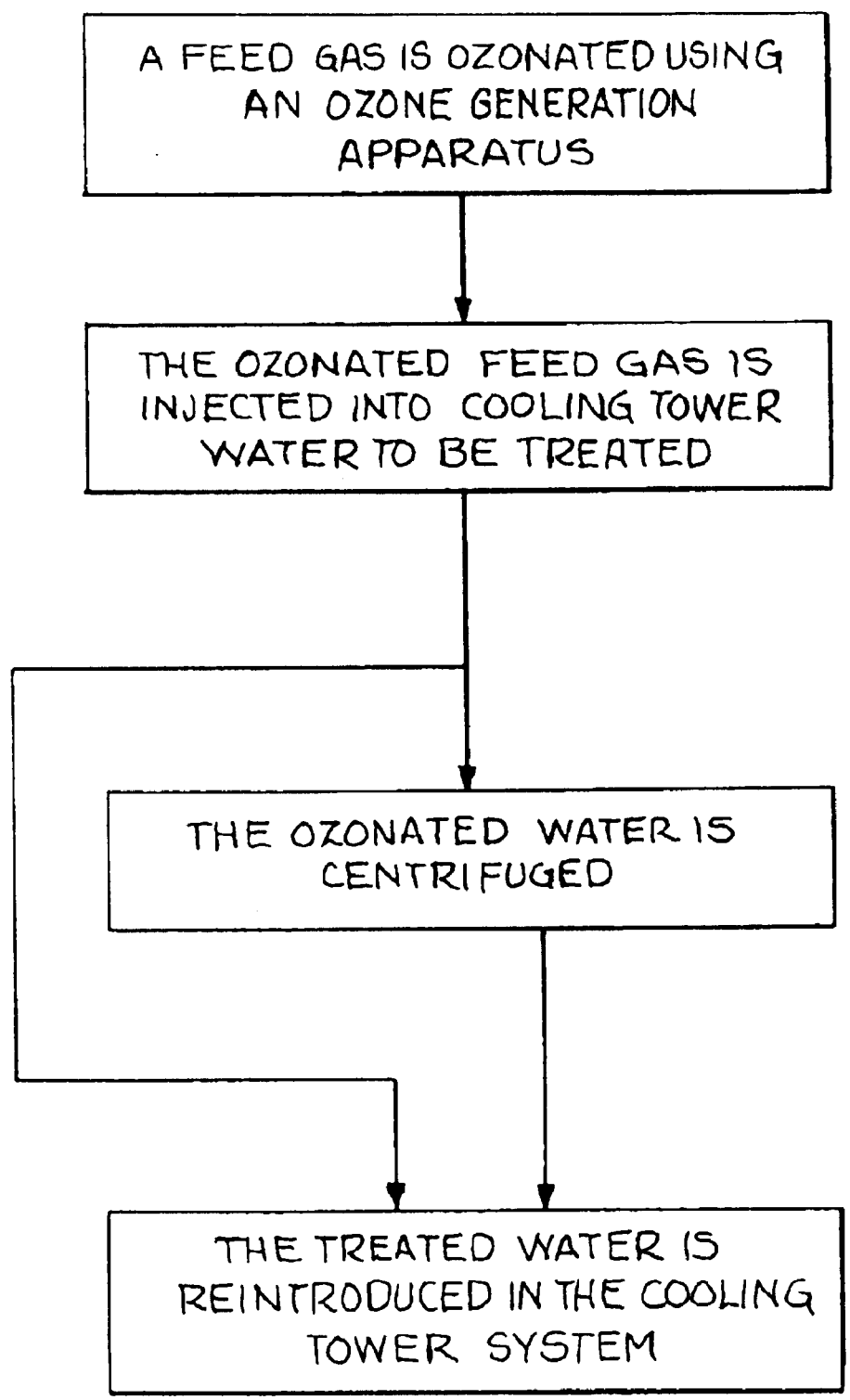
FIG. 13 is a flow chart showing the system and method of the present invention.

Referring now to FIG. 13, a flow chart of an embodiment of the system and method of the present invention is shown. The main steps of this embodiment include the ozonation of a feed gas and the injection of the feed gas into the water to be treated. Thereafter, preferably, the ozonated water is passed through a centrifuge and then re-introduced into the cooling tower system. In this embodiment, any ozone generation apparatus may be used, including a prior art apparatus or any embodiment of an ozone generation apparatus disclosed herein. Optionally, and where an ozone generation apparatus that is one of the embodiments disclosed herein is utilized, the ozonated water may be directly reintroduced into the cooling tower system without centrifuging. These individual steps are now explained in more detail.

With cooling tower water, it is generally not considered necessary to treat all of the water to be used in the system. Typically, approximately ten percent of the water in the system is treated. Whatever portion of the cooling tower is to be treated, that portion is drawn out of the system and pumped to the treatment apparatus. Preferably, the water will be passed through a sand filter, in the range of approximately 25 microns, before pumping. After the water is treated using an ozone generator, preferably one of the embodiments disclosed herein, the next method step involves the injection of the ozonated feed gas into the water to be treated, using an injector. The injector is preferably a venturi-type of injector, such as that produced by Mazzie®. Presently, ozone treatment of water is accomplished using large, reverse-flow atmospheric chambers. This process is relatively inefficient, and causes only about sixty percent of the ozone to be placed into solution. In contrast, a venturi-type of injector has been shown to have the ability to place in excess of ninety percent of the ozone into solution within three feet of injection. (Except where specifically noted, the term "injector" is intended to generally refer to all methods of treating water with ozonated feed gas—with the term "venturi injector" referring specifically to a venturi type of injection system, such as that produced by Mazzie®.)

Preferably, the ozone-injected water is next passed through a centrifuge, such as a LAKOS® separator. The purpose of this step is to pull from the solution minerals that have been separated as a result of the ozone injection step, which minerals are heavier than the surrounding solution and which minerals will therefore drop to the bottom of the centrifuge during operation. From a cylinder located at the bottom of the centrifuge, the minerals are periodically discharged. The treated water is then re-introduced into the cooling tower system, preferably at a point remote from the pump that will carry the cooling tower water for spraying into the atmosphere.

While the invention has been particularly shown and described with reference to preferred embodiments thereof, it will be understood by those skilled in the art that the foregoing and other changes in form and details may be made therein without departing from the spirit and scope of the invention.

I claim:

1. A system for treating cooling tower water comprising, in combination:

an apparatus for bombarding a feed gas with electrons to generate ozone and other atoms and molecules comprising:
a first electrode;
wherein said first electrode comprises:
an electron gun coupled to a power source and located proximate one end of said first electrode;
a rod in electrical communication with said electron gun;
a first tube of dielectric material disposed along a length of said rod;
a second tube of dielectric material dimensioned to receive therein said first tube;
wherein said second tube is substantially sealed; and
an inert gas disposed within each of said first tube and said second tube;
a second electrode containing a channel dimensioned to receive therein said first electrode so that sufficient space is present between said first electrode and said second electrode that a feed gas may be passed through said channel along an exterior surface of said first electrode;
a feed gas inlet coupled to said second electrode and wherein said feed gas inlet is in communication with said channel;

a feed gas outlet coupled at a first end thereof to said second electrode and wherein said feed gas outlet is in communication with said channel; and an injector coupled to said feed gas outlet.

2. The system of claim 1 wherein said power source is non-current limited.

3. The system of claim 1 wherein said electron gun further comprises a ceramic ring at an outlet portion thereof.

4. The system of claim 1 wherein said rod comprises aluminum.

5. The system of claim 1 wherein said rod comprises stainless steel.

6. The system of claim 1 wherein said rod comprises tungsten.

7. The system of claim 1 wherein said rod contacts said electron gun.

8. The system of claim 1 wherein a gap is present between said rod and said electron gun.

9. The system of claim 8 wherein said gap has a length of approximately one-half inch.

10. The system of claim 8 wherein said gap has a length of approximately one inch.

11. The system of claim 1 further comprising means for substantially centering said first tube.

12. The system of claim 11 wherein said means comprises an insulated cylinder disposed around a portion of said first tube.

13. The system of claim 12 wherein said means further comprises mica fragments contacting each of said first tube and said second tube.

14. The system of claim 11 wherein said means comprises mica fragments contacting each of said first tube and said second tube.

15. The system of claim 1 further comprising a shock absorbing material disposed below said rod at a bottom portion of said second tube.

16. The system of claim 15 wherein said shock absorbing material comprises fiberglass.

17. The system of claim 1 wherein said second electrode further comprises means for cooling said first electrode.

18. The system of claim 17 wherein said cooling means comprises:
   a substantially fluid-tight chamber formed in an interior portion of said second electrode to permit the passage of a coolant material about a side of said channel opposite a side of said channel exposed to a flow of said feed gas;
   a coolant inlet coupled to said fluid-tight chamber; and
   a coolant outlet coupled to said fluid-tight chamber.

19. The system of claim 1 further comprising:
   an ultraviolet light source positioned within a quartz well; and
   means for swirling water injected with said feed gas about said quartz well.

20. The system of claim 19 wherein said ultraviolet light source emits ultraviolet light a wavelength of approximately 254 nanometers.

21. The system of claim 19 wherein said quartz well is located within said second electrode.

22. The system of claim 21 wherein said second electrode further comprises means for cooling said first electrode.

23. The system of claim 22 wherein said cooling means comprises:
   a substantially fluid-tight chamber formed in an interior portion of said second electrode;
   a coolant inlet coupled to said substantially fluid-tight chamber and angled to pass water injected with ozonated feed gas in a swirling motion through said fluid-tight chamber and about said quartz well and about a side of said channel opposite a side of said channel exposed to a flow of said feed gas; and
   a coolant outlet coupled to said fluid-tight chamber.

24. The system of claim 22 comprising one said ultraviolet light source for each two said first electrodes.

25. The system of claim 1 wherein said first electrode further comprises a second electron gun coupled to a power source and located proximate a second end of said first electrode.

26. The system of claim 1 wherein said injector comprises a venturi injector.

27. The system of claim 1 wherein said first electrode comprises at least two electron guns coupled to a power source and located proximate one end of said first electrode.

28. The system of claim 27 wherein each of said at least two electron guns has a rod in electrical communication therewith.

29. The system of claim 1 comprising at least two rods in electrical communication with said electron gun.

30. A system for treating cooling tower water comprising, in combination:
   an apparatus for bombarding a feed gas with electrons to generate ozone and other atoms and molecules comprising:
      a first electrode comprising a substantially sealed tube of dielectric material;
      wherein said first electrode further comprises:
         a first electron gun coupled to a power source, located proximate one end of said first electrode, and adapted to fire electrons into said substantially sealed tube of dielectric material;
         a second electron gun coupled to a power source, located proximate a second end of said first electrode, and adapted to fire electrons into said substantially sealed tube of dielectric material; and
         an inert gas disposed within said substantially sealed tube of dielectric material;
      a second electrode containing a channel dimensioned to receive therein said first electrode so that sufficient space is present between said first electrode and said second electrode that a feed gas may be passed through said channel along an exterior surface of said first electrode;
      a feed gas inlet coupled to said second electrode and wherein said feed gas inlet is in communication with said channel;
      a feed gas outlet coupled at a first end thereof to said second electrode and wherein said feed gas outlet is in communication with said channel; and
      an injector coupled to said feed gas outlet.

31. A method for treating cooling tower water comprising the steps of:
   providing an apparatus for bombarding a feed gas with electrons to generate ozone and other atoms and molecules comprising:
      a first electrode;
      wherein said first electrode comprises:
         an electron gun coupled to a power source and located proximate one end of said first electrode;
         a rod in electrical communication with said electron gun;
         a first tube of dielectric material disposed along a length of said rod;
         a second tube of dielectric material dimensioned to receive therein said first tube;

wherein said second tube is substantially sealed; and an inert gas disposed within each of said first tube and said second tube;

a second electrode containing a channel dimensioned to receive therein said first electrode so that sufficient space is present between said first electrode and said second electrode that a feed gas may be passed through said channel along an exterior surface of said first electrode;

a feed gas inlet coupled to said second electrode and wherein said feed gas inlet is in communication with said channel; and a feed gas outlet coupled at a first end thereof to said second electrode and wherein said feed gas outlet is in communication with said channel;

providing an injector coupled to said feed gas outlet;

providing power from said power source to said electron gun;

passing a feed gas into said feed gas inlet, through said channel, and out of said feed gas outlet; and injecting said feed gas passing out of said feed gas outlet into cooling tower water.

32. The method of claim 31 wherein said power source is non-current limited.

33. The method of claim 31 wherein said electron gun further comprises the step of providing a ceramic ring at an outlet portion thereof.

34. The method of claim 31 wherein said rod comprises aluminum.

35. The method of claim 31 wherein said rod comprises stainless steel.

36. The method of claim 31 wherein said rod comprises tungsten.

37. The method of claim 31 wherein said rod contacts said electron gun.

38. The method of claim 31 wherein a gap is present between said rod and said electron gun.

39. The method of claim 38 wherein said gap has a length of approximately one-half inch.

40. The method of claim 38 wherein said gap has a length of approximately one inch.

41. The method of claim 31 further comprising means for substantially centering said first tube.

42. The method of claim 41 wherein said means comprises an insulated cylinder disposed around a portion of said first tube.

43. The method of claim 42 wherein said means further comprises mica fragments contacting each of said first tube and said second tube.

44. The method of claim 41 wherein said means comprises mica fragments contacting each of said first tube and said second tube.

45. The method of claim 31 further comprising a shock absorbing material disposed below said rod at a bottom portion of said second tube.

46. The method of claim 45 wherein said shock absorbing material comprises fiberglass.

47. The method of claim 31 wherein said second electrode further comprises means for cooling said first electrode.

48. The method of claim 47 wherein said cooling means comprises:

a substantially fluid-tight chamber formed in an interior portion of said second electrode to permit the passage of a coolant material about a side of said channel opposite a side of said channel exposed to a flow of said feed gas;

a coolant inlet coupled to said fluid-tight chamber; and a coolant outlet coupled to said fluid-tight chamber.

49. The method of claim 48 further comprising the step of providing a coolant into said coolant inlet at a temperature that will result in said coolant exiting said coolant outlet at a temperature is below approximately ninety degrees Fahrenheit.

50. The method of claim 48 further comprising the step of providing a coolant into said coolant inlet at a temperature that will result in said coolant exiting said coolant outlet at a temperature in the range of approximately eighty-five degrees Fahrenheit.

51. The method of claim 48 further comprising the step of providing a coolant into said coolant inlet at a temperature that will result in said coolant exiting said coolant outlet at a temperature between approximately ninety degrees and one hundred and five degrees Fahrenheit.

52. The method of claim 31 further comprising the steps of:

providing an ultraviolet light source positioned within a quartz well; and providing means for swirling water injected with ozonated feed gas about said quartz well.

53. The method of claim 52 wherein said ultraviolet light source emits ultraviolet light a wavelength of approximately 254 nanometers.

54. The method of claim 52 wherein said quartz well is located within said second electrode.

55. The method of claim 54 wherein said second electrode further comprises means for cooling said first electrode.

56. The method of claim 55 wherein said cooling means comprises:

a substantially fluid-tight chamber formed in an interior portion of said second electrode;

a coolant inlet coupled to said substantially fluid-tight chamber and angled to pass water injected with said feed gas in a swirling motion through said fluid-tight chamber and about said quartz well and about a side of said channel opposite a side of said channel exposed to a flow of said feed gas; and a coolant outlet coupled to said fluid-tight chamber.

57. The method of claim 55 comprising one said ultraviolel light source for each two said first electrodes.

58. The method of claim 31 wherein said first electrode further comprises a second electron gun proximate a second end of said first electrode.

59. The method of claim 31 wherein said first electrode comprises at least two electron guns coupled to a power source and located proximate one end of said first electrode.

60. The method of claim 59 wherein each of said at least two electron guns has a rod in electrical communication therewith.

61. The system of claim 31 comprising at least two rods in electrical communication with said electron gun.

* * * * *